US012517444B2

(12) United States Patent
Mori et al.

(10) Patent No.: US 12,517,444 B2
(45) Date of Patent: Jan. 6, 2026

(54) TONER

(71) Applicants: Ayaka Mori, Shizuoka (JP); Yoshitaka Yamauchi, Shizuoka (JP); Kohtaroh Ogino, Shizuoka (JP); Masayuki Ishii, Shizuoka (JP)

(72) Inventors: Ayaka Mori, Shizuoka (JP); Yoshitaka Yamauchi, Shizuoka (JP); Kohtaroh Ogino, Shizuoka (JP); Masayuki Ishii, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 379 days.

(21) Appl. No.: 18/101,119

(22) Filed: Jan. 25, 2023

(65) Prior Publication Data

US 2023/0251588 A1 Aug. 10, 2023

(30) Foreign Application Priority Data

Feb. 4, 2022 (JP) ................................ 2022-016595

(51) Int. Cl.
*G03G 9/087* (2006.01)
*G03G 9/097* (2006.01)

(52) U.S. Cl.
CPC ..... *G03G 9/08755* (2013.01); *G03G 9/08706* (2013.01); *G03G 9/09733* (2013.01)

(58) Field of Classification Search
CPC ........... G03G 9/08708; G03G 9/08788; G03G 9/08795; G03G 9/08797
See application file for complete search history.

(56) References Cited

U.S. PATENT DOCUMENTS

| | | | | |
|---|---|---|---|---|
| 5,486,445 | A * | 1/1996 | Van Dusen .......... | G03G 9/0825 430/108.2 |
| 5,614,347 | A | 3/1997 | Aoki et al. | |
| 2019/0384199 | A1 | 12/2019 | Holloway et al. | |
| 2020/0363743 | A1 | 11/2020 | Nakajima et al. | |
| 2021/0026267 | A1 | 1/2021 | Hanatani et al. | |
| 2021/0072656 | A1 | 3/2021 | Kaneko et al. | |
| 2021/0302852 | A1 * | 9/2021 | Ishikawa ............ | G03G 9/09371 |
| 2022/0128917 | A1 | 4/2022 | Shu et al. | |

FOREIGN PATENT DOCUMENTS

| | | | | |
|---|---|---|---|---|
| CA | 2125305 | * | 4/2001 | ............... G03G 9/08 |
| JP | H08-278658 | | 10/1996 | |
| JP | H09-222751 | | 8/1997 | |
| JP | 2007-086502 | A | 4/2007 | |
| JP | 4535017 | | 9/2010 | |
| JP | 4773935 | | 9/2011 | |
| JP | 2012-180465 | A | 9/2012 | |
| JP | 2015-184507 | A | 10/2015 | |
| JP | 2021-148895 | A | 9/2021 | |

OTHER PUBLICATIONS

U.S. Appl. No. 18/086,687, filed Dec. 22, 2022.
U.S. Appl. No. 18/081,701, filed Dec. 15, 2022.
Office Action issued Sep. 16, 2025 in Japanese Patent Application No. 2022-016595, 7 pages.

* cited by examiner

*Primary Examiner* — Peter L Vajda
(74) *Attorney, Agent, or Firm* — XSENSUS LLP

(57) ABSTRACT

A toner includes: a crystalline polyester resin; and a partially hydrogenated petroleum resin. A hydrogenation rate of the partially hydrogenated petroleum resin is from 30% through 70%. An amount of the partially hydrogenated petroleum resin relative to the toner is from 1% by mass through 15% by mass.

19 Claims, 1 Drawing Sheet

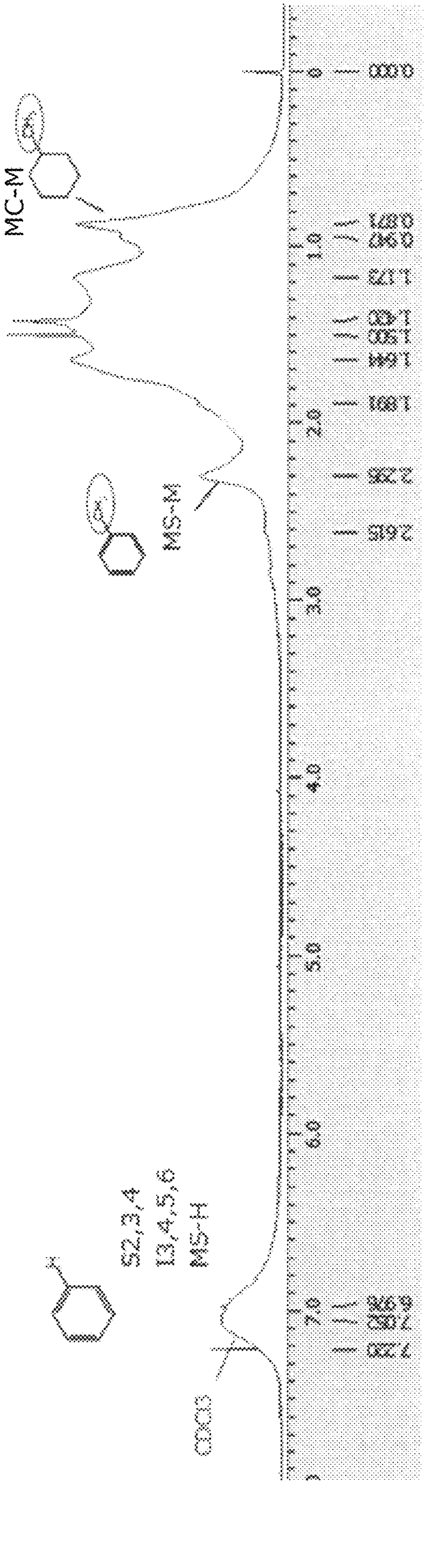
MC-M
MS-M
S2,3,4
I3,4,5,6
MS-H

TONER

CROSS-REFERENCE TO RELATED APPLICATION

The present application claims priority under 35 U.S.C. § 119 to Japanese Patent Application No. 2022-016595, filed Feb. 4, 2022. The contents of which are incorporated herein by reference in their entirety.

BACKGROUND OF THE INVENTION

1. Field of the Invention

The disclosures herein generally relate to a toner.

2. Description of the Related Art

Hitherto, an electric latent image or magnetic latent image has been developed with a toner for developing an electrostatic latent image (referred to as "toner" in the present disclosure) in an electrophotographic apparatus, an electrostatic recording apparatus, or the like. For example, in electrophotography, an electrostatic latent image is formed on a photoconductor, and is developed with a toner, to form a toner image. The toner image is generally transferred onto a recording medium such as paper, and is fixed through a method such as heating.

In recent years, development of toners in consideration of influence on the environment has been demanded. Therefore, a demand for achieving both the low-temperature fixability and the heat-resistant storage stability of the toner is increasing. The reason for this is because a decrease in energy required for fixing saves energy.

As a means for achieving both the low-temperature fixability and the heat-resistant storage stability of the toner, toners including a petroleum resin as a resin component are proposed. Among them, a technique, which uses both a petroleum resin that is subjected to hydrogenation (also referred to as "hydrogenated petroleum resin" in the present disclosure) and a styrene-based resin, has been already known.

For example, Japanese Unexamined Patent Application Publication No. 9-222751 discloses a toner for developing an electrostatic charge image, which is obtained by adding a hydrogenated petroleum resin to a resin containing from 5% by weight through 50% by weight of a tetrahydrofuran insoluble content, where an amount of the tetrahydrofuran insoluble content of the toner is from 1% by weight through 20% by weight. In the specific embodiment, a toner containing a hydrogenated petroleum resin and a styrene·acrylic-based resin is disclosed.

SUMMARY OF THE INVENTION

In one embodiment, a toner includes a crystalline polyester resin and a partially hydrogenated petroleum resin. A hydrogenation rate of the partially hydrogenated petroleum resin is from 30% through 70%. An amount of the partially hydrogenated petroleum resin relative to the toner is from 1% by mass through 15% by mass.

BRIEF DESCRIPTION OF THE DRAWINGS

FIG. 1 is one example of a 1H-NMR spectrum for calculating a hydrogenation rate of a hydrogenated petroleum resin.

DESCRIPTION OF THE PREFERRED EMBODIMENTS

In the following, embodiments of the present invention will be described with reference to the accompanying drawings.

The aforementioned toner described in Japanese Unexamined Patent Application Publication No. 9-222751 exhibits its sufficient heat-resistant storage stability and low-temperature fixability, but had a problem in which the dispersibility is poor and the filming property is deteriorated.

An object of the present disclosure is to provide a toner that has excellent heat-resistant storage stability, excellent low-temperature fixability, and an excellent filming property.

According to the present disclosure, it is possible to provide a toner that has excellent heat-resistant storage stability, excellent low-temperature fixability, and an excellent filming property.

In the following, embodiments of the present disclosure will be described in more detail.

The configuration of the present disclosure is as described above, and suitable embodiments of the present disclosure include the following features.

The toner of the present disclosure further includes a hydrocarbon-based wax.

This component can further improve the filming property.

In the toner of the present disclosure, a glass transition temperature of the partially hydrogenated petroleum resin is from 70° C. through 90° C.

This component can further improve the low-temperature fixability and the heat-resistant storage stability.

In the toner of the present disclosure, a weight average molecular weight of the partially hydrogenated petroleum resin is from 2,000 through 4,000.

This component can further enhance the low-temperature fixability and the heat-resistant storage stability.

In the toner of the present disclosure, the hydrogenation rate of the partially hydrogenated petroleum resin is from 40% through 60%.

This component can further enhance the filming property.

<Crystalline Polyester Resin>

The crystalline polyester resin can be obtained by using a polyhydric alcohol and a polyvalent carboxylic acid (e.g., polyvalent carboxylic acid itself, polyvalent carboxylic anhydride, and polyvalent carboxylic acid ester) or derivatives thereof.

Note that, in the present disclosure, the crystalline polyester resin refers to a substance that is obtained by using a polyhydric alcohol, and a polycarboxylic acid or a derivative thereof such as a polycarboxylic acid, a polycarboxylic anhydride, and a polyvalent carboxylic acid ester, as described above. Those obtained by modifying a polyester resin, such as a prepolymer and a resin obtained by cross-linking and/or elongating the prepolymer are not included in the crystalline polyester resin.

In the present disclosure, whether the crystalline polyester resin has crystallinity can be confirmed using a crystallography X-ray diffractometer (e.g., X'Pert Pro MRD, manufactured by Philips). The measurement method will be described below.

First, a target sample is ground in a mortar to prepare a powdery sample, and the obtained powdery sample is uniformly coated on a sample holder. Then, the sample holder is set in a diffractometer, and is measured, to obtain a diffraction spectrum.

Regarding diffraction peaks, when a peak half value width of a peak having the largest peak intensity among peaks obtained within the range of 20°<2θ<25° is 2.0 or less, it is judged that the target sample has crystallinity.

The measurement conditions of the X-ray diffraction are described below.

[Measurement Conditions]

Tension kV: 45 kV
Current: 40 mA
MPSS
Upper
Gonio
Scanmode: continuous
Start angle: 3°
End angle: 35°
Angle Step: 0.02°
Lucident beam optics
Divergence slit: Div slit ½
Difflection beam optics
Anti scatter slit: As Fixed ½
Receiving slit: Prog rec slit —Polyhydric Alcohol—

The polyhydric alcohol is not particularly limited and may be appropriately selected in accordance with the intended purpose. Examples thereof include diol and trihydric or higher alcohols.

Examples of the diol include saturated aliphatic diols. Examples of the saturated aliphatic diols include straight-chain saturated aliphatic diols and branched saturated aliphatic diols. Among them, straight-chain saturated aliphatic diols are preferable, and straight-chain saturated aliphatic diols having 2 or more and 12 or less carbon atoms are more preferable.

Examples of the saturated aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanediol. Among them, ethylene glycol, 1,4-butanediol, 1,6-hexanediol, 1,8-octanediol, 1,10-decanediol, and 1,12-dodecanediol are preferable in terms of high crystallinity of the crystalline polyester resin and excellent sharp melting property.

Examples of the trihydric or higher alcohols include glycerin, trimethylolethane, trimethylolpropane, and pentaerythritol. These may be used alone or in combination.

—Polycarboxylic Acid—

The polycarboxylic acid is not particularly limited and may be appropriately selected in accordance with the intended purpose. Examples thereof include bivalent carboxylic acids and trivalent or higher carboxylic acids.

Examples of the bivalent carboxylic acids include: saturated aliphatic dicarboxylic acids such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids of, for example, dibasic acids such as phthalic acid, isophthalic acid, terephthalic acid, naphthalene-2,6-dicarboxylic acid, malonic acid, and mesaconic acid; anhydrides thereof; and lower (number of carbon atoms: 1 to 3) alkyl esters thereof.

Examples of the trivalent or higher carboxylic acids include 1,2,4-benzenetricarboxylic acid, 1,2,5-benzenetricarboxylic acid, 1,2,4-naphthalenetricarboxylic acid, anhydrides thereof, and lower (number of carbon atoms: 1 to 3) alkyl esters thereof.

As the polycarboxylic acid, dicarboxylic acid having a sulfonic acid group may be included in addition to the saturated aliphatic dicarboxylic acids or the aromatic dicarboxylic acids. Moreover, dicarboxylic acid having a double bond may be included in addition to the saturated aliphatic dicarboxylic acids or the aromatic dicarboxylic acids. These may be used alone or in combination.

The crystalline polyester resin preferably includes a straight-chain saturated aliphatic dicarboxylic acid having 4 or more and 12 or less carbon atoms and a straight-chain saturated aliphatic diol having 2 or more and 12 or less carbon atoms.

That is, the crystalline polyester resin preferably includes: a constituent unit derived from the saturated aliphatic dicarboxylic acid having 4 or more and 12 or less carbon atoms; and a constituent unit derived from the saturated aliphatic diol having 2 or more and 12 or less carbon atoms. This can achieve high crystallinity and an excellent sharp melting property, thereby exhibiting an excellent low-temperature fixability, which is preferable.

The melting point of the crystalline polyester resin is not particularly limited and may be appropriately selected in accordance with the intended purpose. The melting point thereof is preferably 60° C. or more and 80° C. or less. Within this range of the melting point, the heat-resistant storage stability and the low-temperature fixability of the toner are improved.

The molecular weight of the crystalline polyester resin is not particularly limited and may be appropriately selected in accordance with the intended purpose. However, such a crystalline polyester resin that has a sharp molecular weight distribution and a low molecular weight is excellent in the low-temperature fixability, and a crystalline polyester resin containing large amounts of components having a low molecular weight deteriorates the heat-resistant storage stability. From these viewpoints, the soluble content of o-dichlorobenzene of the crystalline polyester resin preferably has a weight average molecular weight (Mw) of from 3,000 through 30,000, a number average molecular weight (Mn) of from 1,000 through 10,000, and an Mw/Mn of from 1.0 through 10 in the GPC measurement. The soluble content of o-dichlorobenzene of the crystalline polyester resin more preferably has a weight average molecular weight (Mw) of from 5,000 through 15,000, a number average molecular weight (Mn) of from 2,000 through 10,000, and an Mw/Mn of from 1.0 through 5.0.

The acid value of the crystalline polyester resin is not particularly limited and may be appropriately selected in accordance with the intended purpose. In terms of affinity between paper and a resin, the acid value thereof is preferably 5 mg KOH/g or more, and more preferably 10 mg KOH/g or more, in order to achieve a desirable low-temperature fixability. On the other hand, the acid value thereof is preferably 45 mg KOH/g or less in order to improve the high-temperature offset resistance.

The hydroxyl value of the crystalline polyester resin is not particularly limited and may be appropriately selected in accordance with the intended purpose. The hydroxyl value thereof is preferably from 0 mg KOH/g through 50 mg KOH/g, and more preferably from 5 mg KOH/g through 50 mg KOH/g, in order to achieve a desirable low-temperature fixability and good charging characteristics.

The molecular structure of the crystalline polyester resin can be confirmed through, for example, the X-ray diffraction, GC/MS, LC/MS, or IR measurement in addition to the NMR measurement of the solution or solid. In a simple manner, a method, in which one having an absorption based on δCH (out-of-plane bending vibration) of olefin at 965±10 $cm^{-1}$ or 990±10 $cm^{-1}$ in infrared spectroscopy is detected as the crystalline polyester resin, can be exemplified.

The amount of the crystalline polyester resin is not particularly limited and may be appropriately selected in accordance with the intended purpose. The amount thereof is preferably from 5.0% by mass through 15.0% by mass, and more preferably from 6.5% by mass through 10.0% by mass, relative to the total amount of the toner.

<Partially Hydrogenated Petroleum Resin>

The partially hydrogenated petroleum resin is a resin obtained by partially adding hydrogen to an unsaturated bond remaining on a petroleum resin, followed by reduction. The petroleum resin is obtained by using a petroleum-based unsaturated hydrocarbon as a raw material, where the petroleum-based unsaturated hydrocarbon is obtained by purifying decomposition oil fractions, which are secondarily produced when naphtha is decomposed to produce, for example, ethylene, acetylene, and propylene. Examples of the petroleum resin include $C_5$-$C_6$ aliphatic petroleum resins including $C_5$-$C_6$ aliphatic hydrocarbon as a raw material, $C_5$-$C_6$ aromatic petroleum resins including $C_6$-$C_8$ aromatic hydrocarbon as a raw material, aliphatic-aromatic polymerization-type petroleum resins including both aliphatic hydrocarbon and aromatic hydrocarbon as raw materials, petroleum resins including dicyclopentadiene as a main raw material, and petroleum resins including higher olefin as a main raw material. In particular, hydrogenated petroleum resins including $C_6$-$C_8$ aromatic hydrocarbon as a main raw material are exemplified, and use thereof improves the heat-resistant storage stability.

As a method for hydrogenating the petroleum resin, any method may be used as long as it is a common reduction method, but a catalytic reduction method is particularly used. A specific method is a reduction method, in which a heavy metal catalyst such as nickel, palladium, or platinum is used to allow hydrogen to directly act on a petroleum oil under high temperatures of from 150° C. through 250° C. and high pressures of from 30 $kg/cm^2$ through 50 $kg/cm^2$, to add hydrogen to an unsaturated double bond of the petroleum resin.

A hydrogenation rate of the partially hydrogenated petroleum resin used in the present disclosure is from 30% through 70%. When the hydrogenation rate does not fall within this range, the effect of the present disclosure cannot be achieved. The hydrogenation rate of the partially hydrogenated petroleum resin is more preferably from 40% through 60%. Note that, the hydrogenation rate can be measured by the method described in Examples.

The hydrogenation rate can be controlled by changing the reaction pressure at the time of the aforementioned reduction reaction.

A glass transition temperature of the partially hydrogenated petroleum resin used in the present disclosure is preferably from 70° C. through 90° C. This embodiment can further enhance the low-temperature fixability and the heat resistance.

The glass transition temperature can be controlled by changing the reaction pressure at the time of the aforementioned reduction reaction.

The glass transition temperature is a glass transition temperature at the second temperature rise in an endothermic curve obtained using a differential scanning calorimeter.

<<Measurement Method of Glass Transition Temperature (Tg)>>

The glass transition temperature (Tg) in the present disclosure can be measured using, for example, a DSC system (differential scanning calorimeter) ("Q-200", manufactured by TA Instruments).

Specifically, the glass transition temperature of a target sample can be measured in the following procedure.

First, about 5.0 mg of a target sample is charged into a sample container made of aluminum. Next, the sample container is placed on a holder unit, and is set in an electric furnace. Then, the sample container is heated from −80° C. to 150° C. at a temperature rising rate of 10° C./min (the first temperature rise) under nitrogen atmosphere. After that, the sample container is cooled from 150° C. to −80° C. at a temperature decreasing rate of 10° C./min, and is further heated to 150° C. at a temperature rising rate of 10° C./min (the second temperature rise). At the first temperature rise and the second temperature rise, a differential scanning calorimeter ("Q-200", manufactured by TA Instruments) is used to calculate the DSC curve.

From the obtained DSC curves, the DSC curve at the first temperature rise is selected using the analysis program in the Q-200 system, and the glass transition temperature of the target sample at the first temperature rise can be determined. In the same manner, the DSC curve at the second temperature rise is selected, and the glass transition temperature of the target sample at the second temperature rise can be determined.

A weight average molecular weight of the partially hydrogenated petroleum resin used in the present disclosure is preferably from 2,000 through 4,000. This embodiment can further enhance the low-temperature fixability and the heat resistance.

The weight average molecular weight can be controlled by changing the reaction time at the time of the aforementioned reduction reaction. Note that, the weight average molecular weight is a molecular weight in terms of polystyrene measured through gel permeation chromatography (GPC) using o-dichlorobenzene as a developing solvent.

The partially hydrogenated petroleum resin used in the present disclosure can be produced by allowing a cyclopentadiene-based compound and a vinyl aromatic compound to polymerize as described above. At that time, a polymer different in the molecular weight can be produced by controlling the reaction time. Then, the obtained polymer can be hydrogenated in the presence of a hydrogenation catalyst, to produce a partially hydrogenated petroleum resin. In addition, a hydrogenated petroleum resin different in Tg or a hydrogenation rate can be produced by changing the pressure in the presence of a hydrogenation catalyst.

An amount of the partially hydrogenated petroleum resin is not particularly limited and may be appropriately selected in accordance with the intended purpose. The amount thereof is preferably from 1% by mass through 15% by mass, and more preferably from 5% by mass through 15% by mass, relative to the total amount of the toner.

<Other Components>

The toner of the present disclosure may include a traditional resin, a wax, a colorant, a charge-controlling agent, an external additive, a flowability-improving agent, a cleanability-controlling agent, a magnetic material, or the like, in addition to the aforementioned components.

Among them, a wax is preferably used in terms of further improving the filming property.

Examples of the waxes include natural waxes: such as plant-based waxes (e.g., carnauba wax, cotton wax, Japan wax, and rice wax); animal-based waxes (e.g., beeswax and lanolin); mineral-based waxes (e.g., ozocerite and ceresin); and petroleum-based waxes (e.g., paraffin, microcrystalline, and petrolatum).

In addition to these natural waxes, examples of the waxes include: synthetic hydrocarbon waxes such as Fischer-Tropsch wax, polyethylene, and polypropylene; and synthetic waxes such as ester, ketone, and ether.

Furthermore, fatty acid amide-based compounds such as 12-hydroxystearic acid amide, stearic acid amide, phthalic anhydride imide, and chlorinated hydrocarbons; homopolymers or copolymers of polyacrylates such as poly-n-stearyl methacrylate and poly-n-lauryl methacrylate (e.g., a copolymer of n-stearyl acrylate-ethyl methacrylate), which are low-molecular-weight crystalline polymer resins; and crystalline polymers having a long alkyl group in a side chain may be used.

Among them, hydrocarbon-based waxes such as paraffin wax, microcrystalline wax, Fischer-Tropsch wax, polyethylene wax, and polypropylene wax are preferable.

An amount of the wax is not particularly limited and may be appropriately selected in accordance with the intended purpose. The amount thereof is preferably from 5.0% by mass through 10.0% by mass relative to the total amount of the toner.

A method for producing the toner of the present disclosure is not particularly limited. For example, a traditional kneading and pulverizing method or a traditional dissolution and suspension method can be used.

A weight average particle diameter of the toner of the present disclosure is not particularly limited and may be appropriately selected in accordance with the intended purpose. The weight average particle diameter thereof is preferably 5.0 μm or more and 6.0 μm or less.

The toner of the present disclosure may be used as a developer, and may include appropriately selected other components such as a carrier if necessary. The developer may be a one-component developer or may be a two-component developer.

The toner of the present disclosure can be applied to traditional image forming apparatuses and image forming methods.

The image forming apparatus includes at least an electrostatic latent image bearer, an electrostatic latent image forming unit, and a developing unit, and may further include other units if necessary. The image forming method includes a charging step, an exposing step, a developing step, a primary transfer step, a secondary transfer step, a fixing step, and a cleaning step, and may further include other steps if necessary.

EXAMPLES

Hereinafter, the present disclosure will be described more specifically with reference to Examples, but the present disclosure is not limited to the following Examples. Note that, "part(s)" as described below means part(s) by mass.

The partially hydrogenated petroleum resin used in Examples is produced by the following production method.

Partially hydrogenated petroleum resin A: First, a hydrogenation raw material is produced by polymerization of a cyclopentadiene-based compound and a vinyl aromatic-based compound. Specifically, dicyclopentadiene (100 parts by mass), styrene (100 parts by mass), and xylene (200 parts by mass) were charged into a 1 L-autoclave, and were allowed to polymerize at 260° C. for 6 hours. Then, the solvent and the low-molecular-weight polymer were removed through depressurization, reduced pressure, or the like, and ethylcyclohexane (300 parts by mass) was added to 100 parts by mass of the residual resin, followed by dissolution, to obtain a hydrogenation raw material.

Next, the above hydrogenation raw material is subjected to a hydrogenation treatment using a tubular reactor.

Specifically, the hydrogenation raw material obtained above and 2.5 parts by mass of hydrogen relative to 100 parts by mass of the petroleum resin in the hydrogenation raw material were allowed to continuously flow under the following conditions: weight hourly space velocity (WHSV) of 0.6 $hr^{-1}$; pressure of 4 MPa·G, and temperature of 200° C. in a tubular reactor filled with a nickel catalyst (carrier: diatomaceous earth, Ni metal carrying amount: 45% by mass) that contains copper and chromium in an amount of 30% by mass, and were subjected to a hydrogenation treatment, to obtain a partially hydrogenated petroleum resin A.

Partially hydrogenated petroleum resin B: The partially hydrogenated petroleum resin B described in Table 1 was produced in the same manner as in the partially hydrogenated petroleum resin A by changing the reaction time with the catalyst, the addition amounts, the pressure, or the temperature.

Partially hydrogenated petroleum resin C: The partially hydrogenated petroleum resin C described in Table 1 was produced in the same manner as in the partially hydrogenated petroleum resin A by changing the reaction time with the catalyst, the addition amounts, the pressure, or the temperature.

Partially hydrogenated petroleum resin D: The partially hydrogenated petroleum resin D described in Table 1 was produced in the same manner as in the partially hydrogenated petroleum resin A by changing the reaction time with the catalyst, the addition amounts, the pressure, or the temperature.

Partially hydrogenated petroleum resin E: The partially hydrogenated petroleum resin E described in Table 1 was produced in the same manner as in the partially hydrogenated petroleum resin A by changing the reaction time with the catalyst, the addition amounts, the pressure, or the temperature.

Partially hydrogenated petroleum resin F: The partially hydrogenated petroleum resin F described in Table 1 was produced in the same manner as in the partially hydrogenated petroleum resin A by changing the reaction time with the catalyst, the addition amounts, the pressure, or the temperature.

Partially hydrogenated petroleum resin G: The partially hydrogenated petroleum resin G described in Table 1 was produced in the same manner as in the partially hydrogenated petroleum resin A by changing the reaction time with the catalyst, the addition amounts, the pressure, or the temperature.

Partially hydrogenated petroleum resin H: The partially hydrogenated petroleum resin H described in Table 1 was produced in the same manner as in the partially hydrogenated petroleum resin A by changing the reaction time with the catalyst, the addition amounts, the pressure, or the temperature.

Partially hydrogenated petroleum resin I: The partially hydrogenated petroleum resin I described in Table 1 was produced in the same manner as in the partially hydrogenated petroleum resin A by changing the reaction time with the catalyst, the addition amounts, the pressure, or the temperature.

Partially hydrogenated petroleum resin J: The partially hydrogenated petroleum resin J described in Table 1 was produced in the same manner as in the partially hydrogenated petroleum resin A by changing the reaction time with the catalyst, the addition amounts, the pressure, or the temperature.

Partially hydrogenated petroleum resin K: The partially hydrogenated petroleum resin K described in Table 1 was produced in the same manner as in the partially hydrogenated petroleum resin A by changing the reaction time with the catalyst, the addition amounts, the pressure, or the temperature.

The following Table 1 describes the hydrogenation rate (%), the glass transition temperature (Tg), and the weight average molecular weight (Mw) of the respective partially hydrogenated petroleum resins.

TABLE 1

| Kind | Hydrogenation rate | Tg | Mw |
|---|---|---|---|
| A | 30 | 80 | 5000 |
| B | 40 | 75 | 2500 |
| C | 60 | 80 | 2500 |
| D | 30 | 70 | 2500 |
| E | 70 | 90 | 2500 |
| F | 30 | 75 | 4000 |
| G | 40 | 80 | 4000 |
| H | 60 | 85 | 4000 |
| I | 70 | 95 | 4000 |
| J | 80 | 65 | 5000 |
| K | 20 | 75 | 5000 |

The hydrogenation rate of the partially hydrogenated petroleum resin A was calculated using a proton NMR. Details are described below.

Heavy chloroform ($CDCL_3$) (0.7 ml) was added to the sample (about 0.1 g) and was dissolved. Then, the obtained product was charged into an NMR tube (ϕ: 5 mm) to form a measurement sample for NMR.

Measurement apparatus: ECX-500 FT-NMR manufactured by JEOL Ltd.

Measurement temperature: room temperature $^1$H-NMR measurement conditions

Measurement nucleus=1H (500 MHz) data point 64K, Observation width=17 ppm, cumulative number=64 times Measurement pulse=single pulse. jxp, 45° pulse, Relaxation Delay 5 seconds, offset=8 ppm As the hydrogenation rate of the partially hydrogenated petroleum resin A, a ratio between a spectrum area of an aromatic ring signal obtained before hydrogenation appearing at from 6.5 ppm through 7.5 ppm and a spectrum area of an aromatic ring signal obtained after hydrogenation appearing at from 1.0 ppm through 2.0 ppm was calculated as the hydrogenation rate, as described in FIG. 1.

The hydrogenation rates of the other hydrogenated petroleum resins are calculated in the above manner.

The waxes used in Examples are as follows.

Wax A: FT wax (Fischer-Tropsch wax FNP-0090, manufactured by NIPPON SEIRO CO., LTD.)

Wax B: Carnauba wax (manufactured by TOYOCHEM CO., LTD.)

Example 1

—Preparation of Toner Base Particles—

Non-crystalline polyester resin: 69 parts

Crystalline polyester resin (melting point: from 60° C. through 80° C., Mw: from 5,500 through 6,500): 8 parts (Production Method of the Crystalline Polyester Resin)

Fumaric acid and 1,6-hexanediol were charged into a 5 L-four neck flask equipped with a nitrogen-introducing tube, a dehydrating tube, a stirrer, and a thermocouple so that OH/COOH would be 0.9, and were allowed to react together with titanium tetraisopropoxide (500 ppm relative to the resin component) at 180° C. for 10 hours. Then, the obtained product was heated to 200° C. and was allowed to react for 3 hours. Then, it was further allowed to react at a pressure of 8.3 kPa for 2 hours, to obtain a crystalline polyester used in Examples.

The wax A: 5 parts

Carbon black (#44, manufactured by Mitsubishi Chemical Corporation): 11 parts

Azo iron compound (T-77, manufactured by Hodogaya Chemical Co., Ltd.): 1 part

The partially hydrogenated petroleum resin A: 10 parts

The toner raw materials obtained according to the aforementioned formulation were pre-mixed using a Henschel mixer (FM20B, manufactured by Mitsui Miike Chemical Engineering Machinery, Co., Ltd.), and were melted and kneaded using a twin-screw kneader (PCM-30, manufactured by Ikegai Corp) at a temperature of 120° C. After the obtained kneaded product was rolled using a roller so as to have a thickness of 2.7 mm, the rolled product was cooled to room temperature in a belt cooler, and was roughly pulverized using a hammermill so as to have a size of from 200 μm through 300 μm. Next, the pulverized products were finely pulverized using a supersonic jet pulverizer Labojet (manufactured by Nippon Pneumatic Mfg. Co., Ltd.), and were classified using an air flow classifier (MDS-I, manufactured by Nippon Pneumatic Mfg. Co., Ltd.) while the louver opening was appropriately adjusted so that the weight average particle diameter would be 5.8±0.2 μm, to thereby obtain toner base particles of Example 1.

—Production of Toner Particles—

Hydrophobically treated silica (11 parts by mass) and hydrophobically treated titanium oxide (20.03 parts by mass) relative to the aforementioned toner base particles (100 parts by mass) were stirred and mixed using a Henschel mixer, to prepare an externally treated toner. The externally treated toner (5% by mass) and a coating ferrite carrier (95% by mass) were uniformly mixed using a TURBULA mixer (manufactured by Willy A. Bachofen (WAB)) at 48 rpm for 5 minutes, to prepare a toner developer. An image forming apparatus using the toner developer was used to evaluate the low-temperature fixability, the heat-resistant storage stability, and the filming property based on the following evaluation criteria.

<Evaluation of Low-Temperature Fixability>

The [toner developer] was charged into a copying machine (RICOH MPC 6003, manufactured by Ricoh Company, Ltd.), to perform an image output. A solid image having a deposition amount of 0.4 mg/cm$^2$ was output on paper (Type6200, manufactured by Ricoh Company, Ltd.) via exposure, developing, and transfer steps. The linear velocity of the fixing was set to 256 mm/sec. The fixing temperature was sequentially output at 5° C.-intervals, and the lower limit temperature (fixing lower limit temperature: low-temperature fixability) at which the cold offset does not occur was measured. The NIP width of the fixing apparatus was 11 mm.

—Evaluation Criteria of Low-Temperature Fixability—

A: Less than 120° C.

B: 120° C. or more and less than 125° C.

C: 125° C. or more and less than 130° C.

D: 130° C. or more

The "A" and "B" evaluations are acceptable.

<Evaluation of Heat-Resistant Storage Stability>

The toner base particles were stored under the condition of 50° C. for 24 hours, and the penetration was measured according to JIS K2235 (25° C.). As the equipment for measuring the penetration, a penetration meter VR-5610 (manufactured by SHIMADZU CORPORATION) was used.

—Evaluation Criteria of Heat-Resistant Storage Stability—

A: 4.0 mm or more

B: 1.0 mm or more and less than 4.0 mm

C: 0.5 mm or more and less than 1.0 mm

D: Less than 0.5 mm

The "A" and "B" evaluations are acceptable.

<Evaluation of Filming Property>

The toner developer was charged into a copying machine (RICOH MPC 6003, manufactured by Ricoh Company, Ltd.), and a solid image having a deposition amount of 0.4 $mg/cm^2$ was output on paper (Type6200, A4 sheet, manufactured by Ricoh Company, Ltd.) via exposure, developing, and transfer steps, followed by the continuous paper feeding test for 2,000 sheets. Then, smearing on the latent image bearer and smearing on the charging device were visually observed.

—Filming Property—

B: Neither smearing of the latent image bearer nor the filming on the charging device was found.

C: slight smearing of the latent image bearer and slight filming on the charging device were found, and an abnormal image was generated over time.

D: Smearing of the latent image bearer and the filming on the charging device were slightly found, and abnormal images were generated in an early stage.

The "B" and "C" evaluations are acceptable.

The results are presented in Table 2.

Examples 2 to 12 and Comparative Examples 1 to 4

Example 1 was repeated except that the kind of partially hydrogenated petroleum resin, its amount, and the kind of wax were changed as described in Table 2.

The results are presented in Table 2.

TABLE 2

| | Kind of partially hydro-genated petroleum resin | Content in toner (% by mass) | Kind of wax | Low-temper-ature fixability | Heat-resistant storage stability | Filming property |
|---|---|---|---|---|---|---|
| Example 1 | A | 10 | A | B | B | C |
| Example 2 | B | 10 | A | A | A | B |
| Example 3 | C | 10 | A | A | A | B |
| Example 4 | D | 10 | A | A | A | C |
| Example 5 | E | 10 | A | A | A | C |
| Example 6 | F | 10 | A | A | A | C |
| Example 7 | G | 10 | A | A | A | B |
| Example 8 | H | 10 | A | A | A | B |
| Example 9 | I | 10 | A | B | B | C |
| Example 10 | B | 10 | B | A | A | C |
| Example 11 | B | 5 | A | A | A | B |
| Example 12 | B | 15 | A | A | A | B |
| Comparative Example 1 | B | 20 | A | D | A | B |
| Comparative Example 2 | B | 0 | A | D | D | D |
| Comparative Example 3 | J | 10 | A | C | C | D |
| Comparative Example 4 | K | 10 | A | B | B | D |

From the results in Table 2, it was found that the toners of Examples, which include at least a crystalline polyester resin and a partially hydrogenated petroleum resin, where a hydrogenation rate of the partially hydrogenated petroleum resin is from 30% through 70%, and an amount of the partially hydrogenated petroleum resin relative to the toner is from 1% by mass through 15% by mass, have excellent heat-resistant storage stability, excellent low-temperature fixability, and excellent filming property.

Further, the present invention is not limited to these embodiments, and various variations and modifications may be made without departing from the scope of the present invention.

What is claimed is:

1. A toner comprising:

a crystalline polyester resin; and a partially hydrogenated petroleum resin, wherein:

a hydrogenation rate of the partially hydrogenated petroleum resin is from 30% through 70%, an amount of the partially hydrogenated petroleum resin relative to the toner is from 1% by mass through 15% by mass, and a weight average molecular weight of the partially hydrogenated petroleum resin is from 2,000 through 4,000.

2. The toner according to claim 1, further comprising:

a hydrocarbon-based wax.

3. The toner according to claim 1, wherein;

a glass transition temperature of the partially hydrogenated petroleum resin is from 70° C. through 90° C.

4. The toner according to claim 1, wherein;

the hydrogenation rate of the partially hydrogenated petroleum resin is from 40% through 60%.

5. The toner according to claim 1, wherein:

the partially hydrogenated petroleum resin is produced by polymerization of a cyclopentadiene-based compound and a vinyl aromatic compound.

6. The toner according to claim 1, wherein:

a melting point of the crystalline polyester resin is from 60° C. through 80° C.

7. The toner according to claim 1, wherein:

an acid value of the crystalline polyester resin is from 5 mg KOH/g through 45 mg KOH/g.

8. The toner according to claim 1, wherein:

the partially hydrogenated petroleum resin is derived using $C_6$-$C_8$ aromatic hydrocarbon as a main raw material.

9. The toner according to claim 1, wherein:

a weight average particle diameter of the toner is from 5.0 μm through 6.0 μm.

10. The toner according to claim 2, wherein:

an amount of the hydrocarbon-based wax is from 5.0% by mass through 10.0% by mass relative to a total amount of the toner.

11. The toner according to claim 2, wherein:

the hydrocarbon-based wax is selected from the group consisting of paraffin wax, microcrystalline wax, Fischer-Tropsch wax, polyethylene wax, and polypropylene wax.

12. The toner according to claim 1, further comprising:

a non-crystalline polyester resin.

13. The toner according to claim 1, further comprising:

a carbon black colorant.

14. The toner according to claim 1, further comprising:

a charge-controlling agent.

15. The toner according to claim 14, wherein:

the charge-controlling agent is an azo iron compound.

16. The toner according to claim 5, wherein: the vinyl aromatic compound is styrene and the cyclopentadiene-based compound is dicyclopentadiene.

17. The toner according to claim 1, wherein: an amount of the crystalline polyester resin is from 5.0% by mass through 15.0% by mass relative to a total amount of the toner.

18. The toner according to claim 1, wherein: the crystalline polyester resin has a hydroxyl value of from 5 mg KOH/g through 50 mg KOH/g.

19. The toner according to claim 2, wherein: the hydrocarbon-based wax is a Fischer-Tropsch wax.

* * * * *